(12) United States Patent
Galbrecht et al.

(10) Patent No.: US 6,354,964 B1
(45) Date of Patent: Mar. 12, 2002

(54) SINGLE BEAM SIGNAL BLANKING FOR ENHANCED PATH LENGTH CONTROL IN A RING LASER GYRO

(75) Inventors: Craig A. Galbrecht, Lino Lakes; Robert P. Pearson, St. Paul; Lloyd W. Priddy, Mahtomedi, all of MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/455,965

(22) Filed: Dec. 6, 1999

(51) Int. Cl.[7] .............................................. G01C 19/68
(52) U.S. Cl. ...................................... 473/350; 356/474
(58) Field of Search ................................. 356/459, 472, 356/473, 474

(56) References Cited

U.S. PATENT DOCUMENTS

| | | |
|---|---|---|
| 3,373,650 A | 3/1968 | Killpatrick |
| 4,152,071 A | 5/1979 | Podgorski |
| 4,445,779 A | 5/1984 | Johnson |
| 4,526,469 A * | 7/1985 | Egli et al. .................... 356/473 |
| 4,795,259 A * | 1/1989 | Egli et al. .................... 356/473 |
| 4,826,320 A | 5/1989 | Callaghan et al. |
| 4,847,855 A | 7/1989 | Derry et al. |
| 4,864,586 A | 9/1989 | Lind |
| 5,088,824 A | 2/1992 | Killpatrick et al. |
| 5,173,745 A | 12/1992 | Hanse |
| 5,225,889 A | 7/1993 | Fritze et al. |
| 5,249,031 A | 9/1993 | Fritze et al. |
| 5,335,063 A * | 8/1994 | Karpinski et al. .......... 356/473 |
| 5,406,369 A | 4/1995 | Killpatrick et al. |
| 5,486,920 A | 1/1996 | Killpatrick et al. |

* cited by examiner

*Primary Examiner*—Samuel A. Turner
(74) *Attorney, Agent, or Firm*—Kris T. Fredrick

(57) ABSTRACT

Single beam signal (SBS) components of the laser intensity monitor (LIM) signal are blanked from the path length control circuit (PLC). The AC component of the LIM signal, less the SBS components, is then integrated to produce a transducer mirror drive signal. SBS component blanking is synchronized to the dither pick-off signal. Peak power operation of the PLC is enhanced through the removal of the SBS components from the LIM signal.

6 Claims, 5 Drawing Sheets

SINGLE BEAM SIGNAL BLANKING FOR ENHANCED PATH LENGTH CONTROL IN A RING LASER GYRO

FIELD OF THE INVENTION

The present invention relates generally to ring laser gyros (RLGs). In particular, the invention is a system for enhancing path length control (PLC) operation in RLGs.

BACKGROUND OF THE INVENTION

Ring laser gyros (RLGs) are instruments used to measure angular rotation. They include a cavity in which two laser beams travel in counter-rotating (i.e., opposite) directions. The laser beams create an optical interference pattern having characteristics representative of the amount by which the RLG is rotated. The interference pattern is detected and processed to provide the angular rotation measurements. Instruments of this type are generally known and disclosed, for example, in the following U.S. Patents:

| Inventor | Patent No. |
| --- | --- |
| Killpatrick et al. | 3,373,650 |
| Podgorski | 4,152,071 |
| Johnson | 4,445,779 |
| Callaghan et al. | 4,826,320 |
| Derry et al. | 4,847,855 |
| Lind | 4,864,586 |
| Killpatrick et al. | 5,088,824 |
| Hanse | 5,173,745 |
| Fritze et al. | 5,225,889 |
| Fritze et al. | 5,249,031 |
| Killpatrick et al. | 5,406,369 |
| Killpatrick et al. | 5,486,920 |

RLGs are subject to a phenomenon known as "lock-in" which can degrade their measurement accuracy. One known approach for minimizing lock-in is dithering. Dithering is the mechanical oscillation of the RLG. This function is provided by a dither system which includes a motor for generating the oscillations, and a transducer for generating a signal known as the dither pick-off which is representative of the dither motion amplitude and frequency. The dither frequency is typically in the range of 600 Hz. The dither pick-off signal is processed along with the detected interference pattern to provide the angular rotation measurements RLGs also typically include a path length control (PLC) system which adjusts the path length of the laser beams within the RLG cavity to maintain peak steady state intensity/power. This function is provided by one or more transducer mirrors which are driven by a control system. A primary input to the control system is the laser intensity monitor signal (LIM signal) generated as a function of one of the laser beams. In addition to a DC component (which is filtered out and not used for the PLC function), the LIM signal includes an AC component at twice the dither frequency (each turnaround) known as the single beam signal (SBS) and 3 KHz modulation information. The SBS is a sinusoidal variation component which occurs at points in time corresponding to the mechanical turnaround points of the dither periods. The AC components (SBS and 3 KHz modulation) of the LIM signal are amplified and inputted into a demodulator along with demodulator clock gating signals (a pair of complimentary 3 KHz square wave signals in one embodiment). The demodulated AC components of the LIM signal are then integrated to produce the transducer mirror drive signal.

There remains a continuing need for RLGs with improved measurement accuracy. Systems that provide significant performance enhancements and can be efficiently implemented with relatively little hardware and software overhead would be especially desirable.

SUMMARY OF THE INVENTION

The present invention is a single beam signal (SBS) blanking system implemented in the path length control (PLC) system of a ring laser gyro. The system enhances the PLC's ability to maintain peak power operation, and thereby increases measurement accuracy performance of the RLG. It can also be efficiently implemented with hardware and/or software.

One embodiment of the invention is a path length control system which includes a dither pick-off terminal or connection for receiving a dither pick-off signal, a laser intensity monitor (LIM) terminal or connection for receiving a LIM signal that includes single beam signal (SBS) components, and a demodulator clock terminal or connection for receiving a demodulator clock signal. The path length control system also includes a demodulator, an integrator and a blanking controller. The demodulator, which is coupled to the LIM terminal and responsive to a demodulator control signal, provides a demodulated LIM signal to the integrator. The integrator processes the demodulated LIM signal to produce a mirror drive signal. The blanking controller is coupled to the dither pick-off terminal and the demodulator clock terminal. The blanking controller generates the demodulator control gating signals as a function of the dither pick-off signal and the demodulator clock signal. The demodulator control signal causes the SBS components of the LIM signal to be removed from the demodulated LIM signal. In another embodiment the blanking controller includes a blanking pulse generator for producing blanking pulses synchronized in time with the SBS components as a function of the dither pick-off signal.

DETAILED DESCRIPTION OF THE PREFERRED EMBODIMENTS

The single beam blanking system of the present invention is based upon the recognition that the SBS component of the LIM signal is effectively noise which induces errors in the PLC control system. The invention reduces the measurement error caused by the SBS by blanking (eliminating) this signal component from the portion of the LIM signal which is demodulated and integrated (i.e., processed) to produce the transducer mirror drive signal. Furthermore, it has been recognized that the SBS components of the LIM signal are generally synchronized in time with the dither pick-off signal, and that the dither pick-off signal can therefore be used as a control parameter for blanking the SBS component of the LIM signal.

Figure 1:
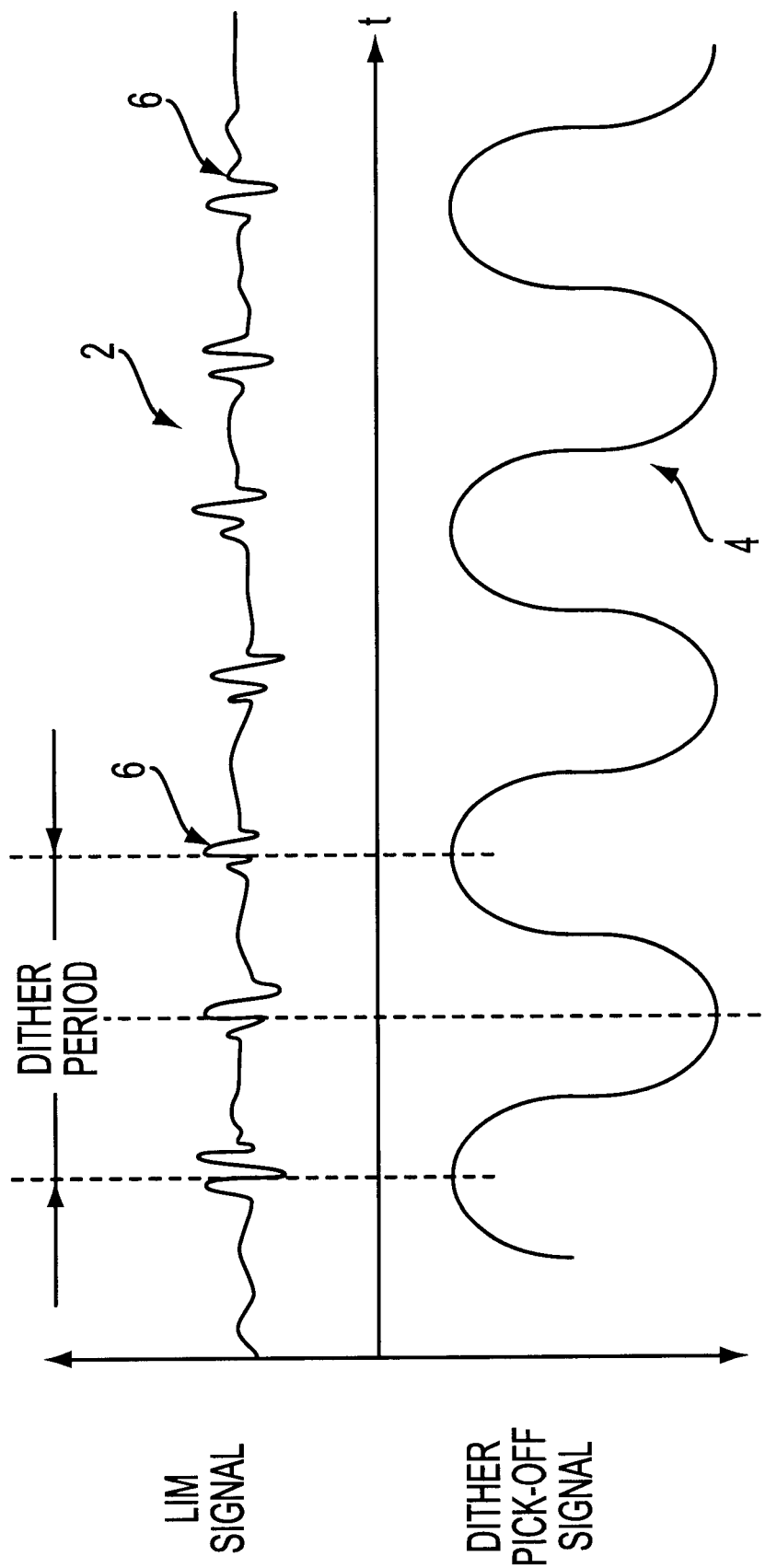
FIG. 1 is a graphical illustration (not to scale) of the phase relationship between the LIM signal and dither pick-off signal in a ring laser gyro.

FIG. 1 is a graphical illustration of the LIM signal 2 and dither pick-off signal 4 (neither of which is shown to scale) present on conventional ring laser gyros. LIM signal 2 and dither pick-off signal 4 are shown as they occur in real time relationship to one another. As is evident from FIG. 1, the SBS components 6 of the LIM signal 2 occur at times corresponding to the peaks of the dither pick-off signal 4.

Figure 2:
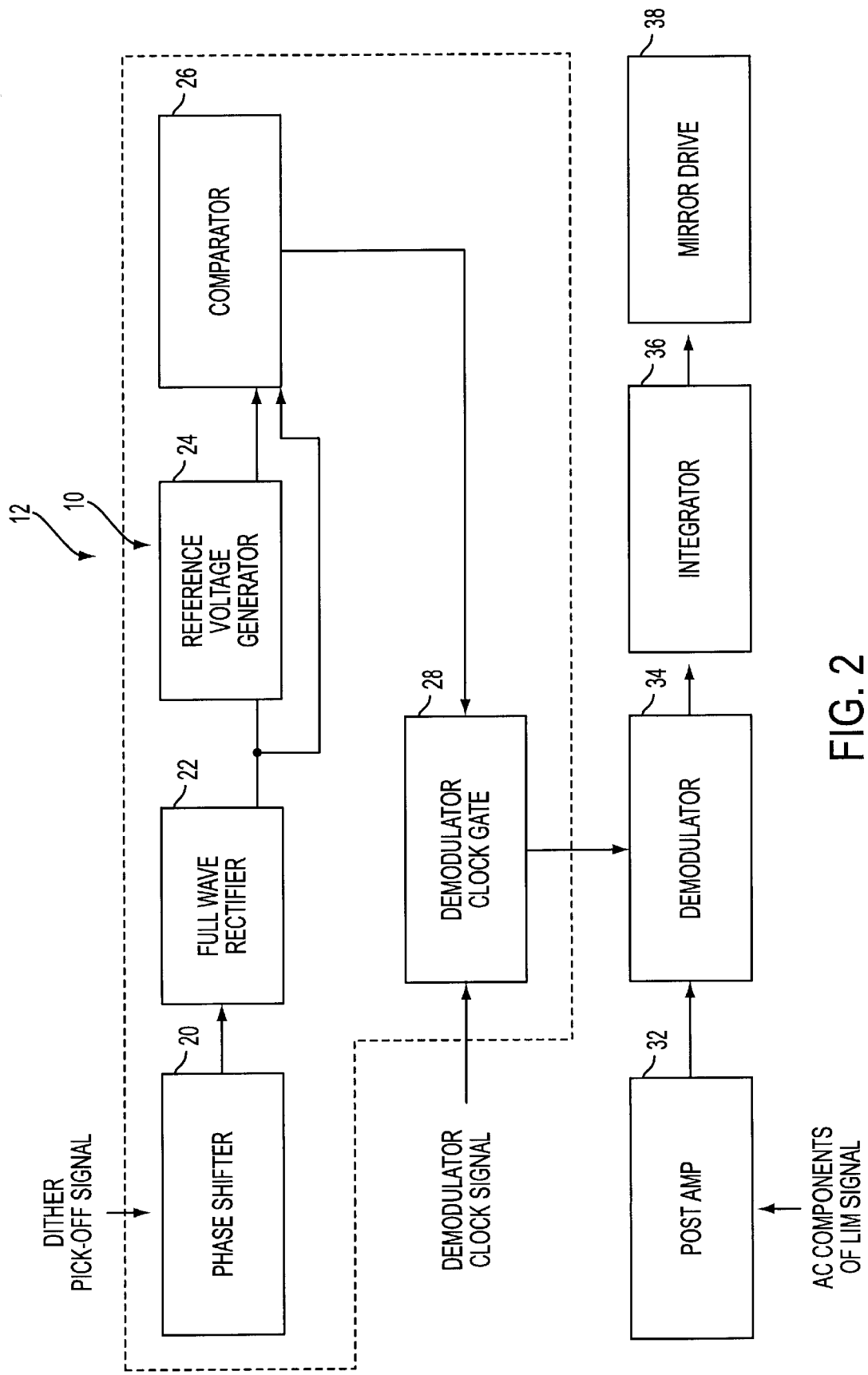
FIG. 2 is a block diagram of a single beam blanking system in accordance with the present invention, and its interfaces to other electronic systems of a ring laser gyro.

FIG. 2 is a block diagram of a preferred embodiment of a single beam blanking system 10 in accordance with the present invention, and the interconnections between the blanking system and other pertinent components of the PLC control system 12 of a ring laser gyro. As shown, the blanking system 10 includes a phase shifter 20, full wave rectifier 22, reference generator 24, comparator 26 and clock gate 28. In addition to the blanking system 10, the illustrated components of the PLC control system 12 include the post amplifier 32, demodulator 34, integrator 36 and mirror drive 38. Post amp 32 is connected to receive the AC components of the LIM signal, including the SBS components. Phase shifter 20 is connected to receive the dither pick-off signal produced by the dither system (not shown). At least portions of blanking system 10 can be implemented by hardware and/or software control. The demodulator clock signal is applied to the clock gate 28.

Figure 3:
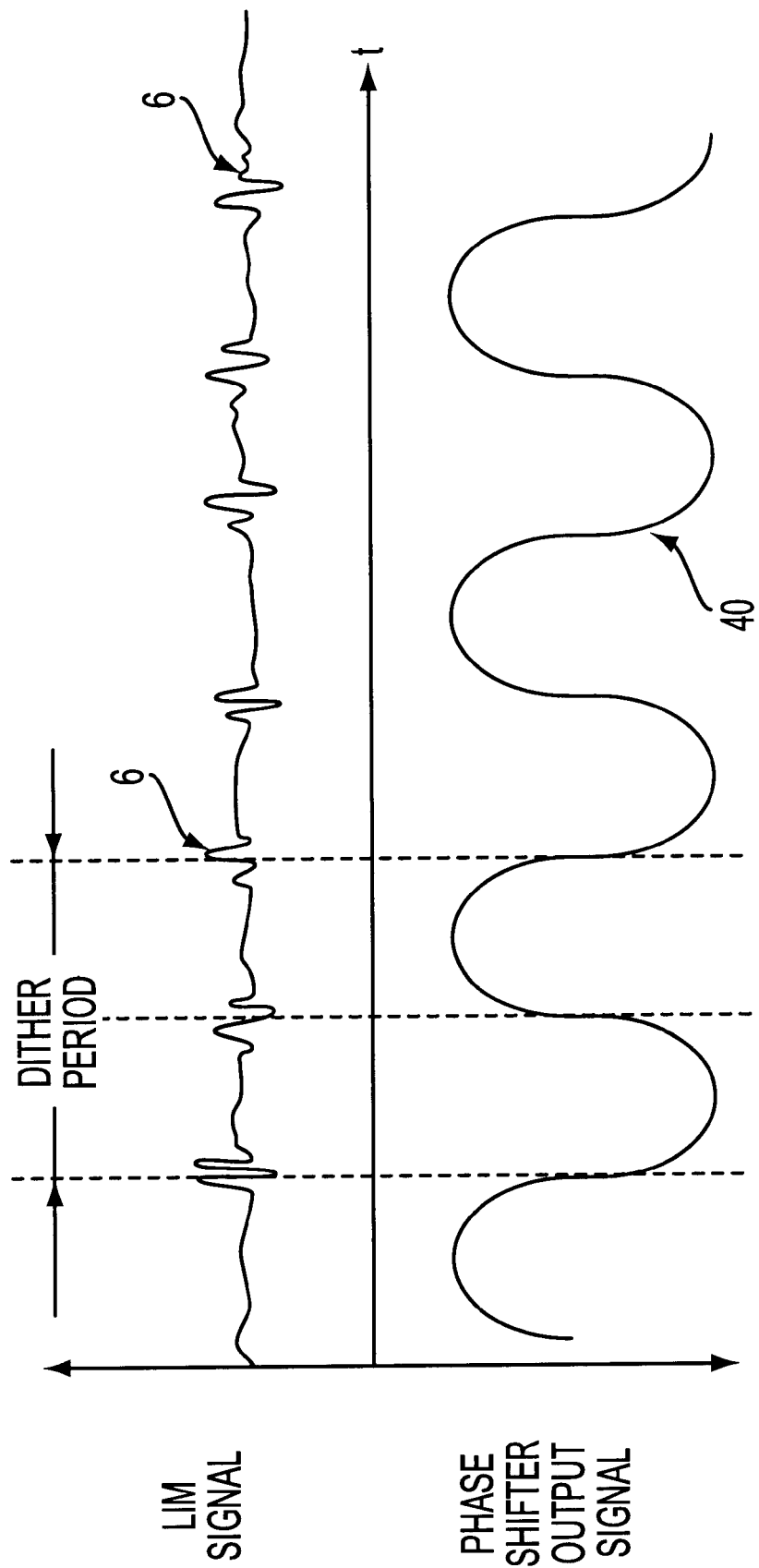
FIG. 3 is a graphical illustration (not to scale) of the phase relationship between the LIM signal and the output signal of the phase shifter shown in FIG. 2.

Phase shifter 20, rectifier 22, reference generator 24, and comparator 26 function to create a blanking control signal. From FIG. 1 it is evident that the SBS components 6 of the LIM signal 2 are approximately 90° out of phase with the zero-crossings of the dither pick-off signal 4. To convert the dither pick-off signal into a blanking control signal, phase shifter 20 shifts the phase of the pick-off signal approximately 90° to produce a copy of the dither signal having its zero-crossings generally aligned in time with the SBS components 6. FIG. 3 is an illustration (not to scale) of the timing relationship between the processed dither pick-off signal at the output of the 90° phase shifter 20 (the phase shifter output signal 40) and the SBS components 6 of the LIM signal 2.

Figure 4:
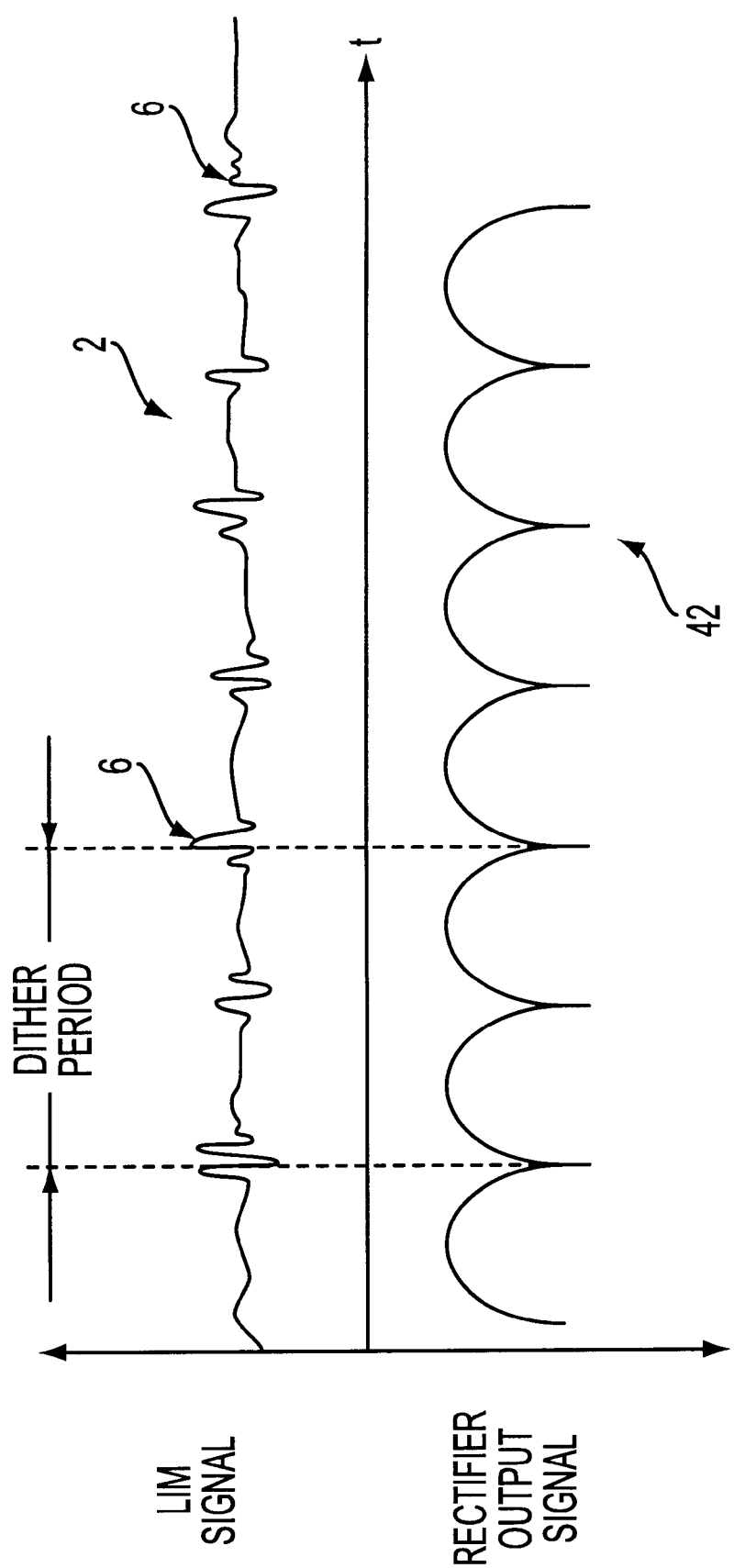
FIG. 4 is a graphical illustration (not to scale) of the phase relationship between the LIM signal and the output signal of the rectifier shown in FIG. 2.

The processed signal from phase shifter 20 is then applied to and full wave rectified by rectifier 22. FIG. 4 is an illustration (not to scale) of the timing relationship between the phase shifted and rectified dither pick-off signal (the rectifier output signal 42) and the SBS components 6 of the LIM signal 2. As shown, the SBS components 6 of the LIM signal 2 are generally phase-aligned with the zero crossings or low voltage points of the rectifier output signal 42.

Figure 5:
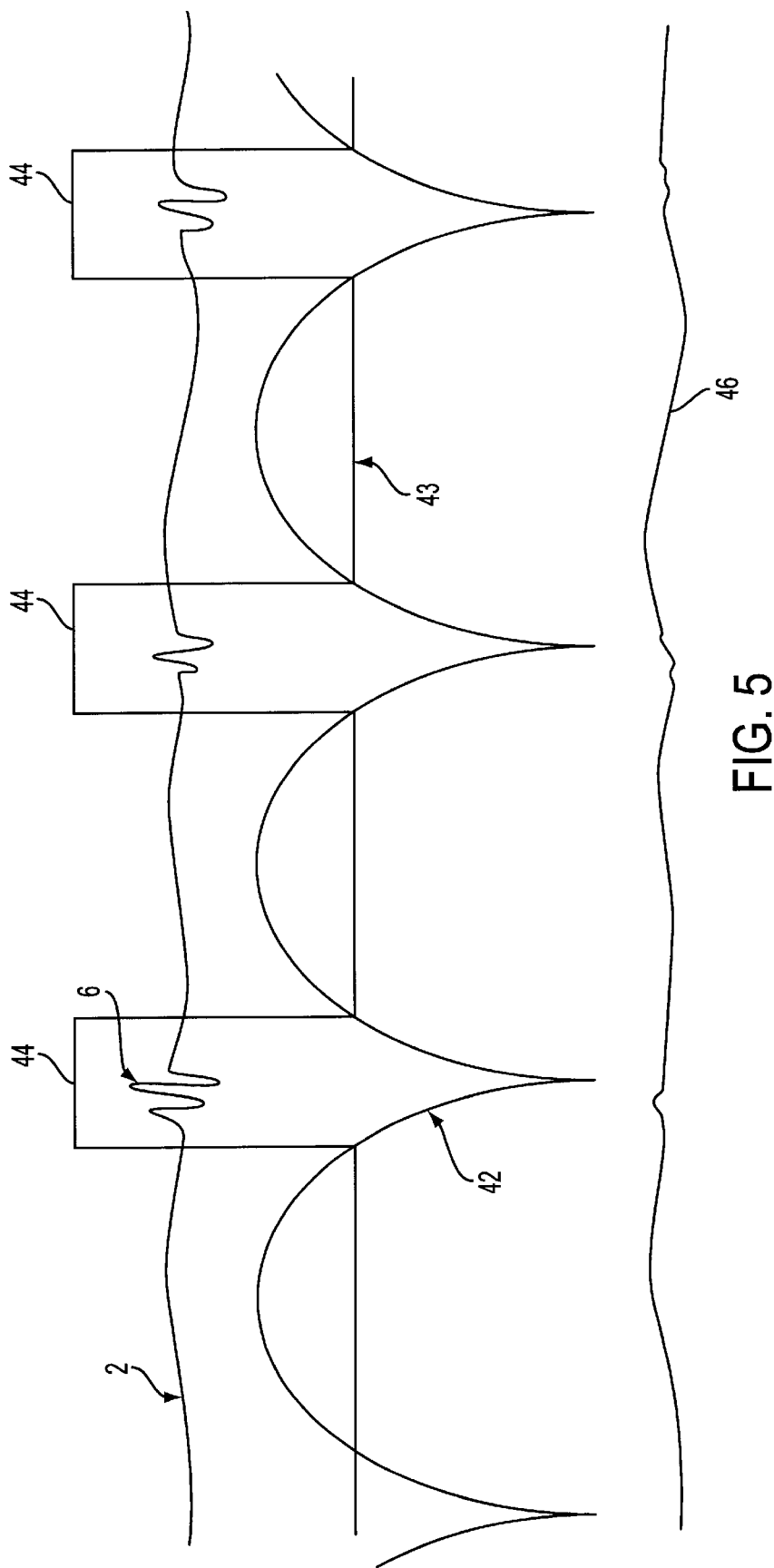
FIG. 5 is a composite graphical illustration (not to scale) of the phase relationship between the LIM signal, the output signal of the rectifier and the output signal of the comparator shown in FIG. 2.

The rectifier output signal 42 is applied to reference generator 24 and comparator 26. Reference generator 24 and comparator 26 cooperate to provide blanking control signals 43 illustrated in FIG. 5 (not to scale) having pulses 44 which are phase-synchronized with the SBS components 6 of the LIM signal 2. Reference generator 24 provides a DC voltage reference signal which represents the trigger point at which the blanking pulses 44 of the blanking control signal 43 switch between first and second states (e.g., between a logic "0" and a logic "1"). The reference signal from reference generator 24 is compared to the rectifier output signal 42 by the comparator 26 to generate the control signal 43 with its blanking pulses 44. In the particular embodiment shown, while the rectifier output signal has a magnitude greater than the magnitude of the reference signal from the reference generator 24, the blanking control signal 43 is switched to create the blanking pulses 44. As shown in FIG. 5, the blanking pulses 44 are phase-synchronized with the SBS components 6 of the LIM signal 2. The reference signal provided by reference generator 24 effectively controls the width of the blanking pulses 44.

The baseline magnitude of the rectifier output signal 42 varies with time and temperature. To compensate for this variation and hold the blanking angle constant, the reference generator 24 filters the rectifier output signal 42, and effectively adds to the baseline value a DC voltage reference signal which is proportional to the amplitude of the rectifier output signal.

At the demodulator clock gate 28 the blanking control signal generated by comparator 26 gates the demodulator clock gating signals to produce the demodulator control signal applied to the demodulator 34. The demodulator clock gate 28 turns off the demodulator clock gating signals during the periods of time corresponding to the blanking pulses 44. Demodulator 34 is thereby effectively disabled during the periods of time corresponding to the blanking pulses 44, preventing the SBS components 6 of the LIM signal 2 from being processed by the PLC control system 12 (e.g. from being integrated by integrator 36). In effect, the demodulator clock signal controls the demodulator 34 in a manner similar to that of a conventional PLC system, but in addition the blanking system 10 causes the demodulator 34 to be disabled during the periods of time that the SBS components 6 are present in the LIM signal 2 applied to the demodulator 34. The signal outputted from the demodulator 34 is illustrated at 46 in FIG. 5.

In one embodiment the clock gate 28 includes a pair of transistors (not, shown) which function as switches to control the application of the clock gating signals to demodulator 34. The blanking control signal generated by comparator 26 is applied to the bases of these transistors to control the switching action.

The width of the blanking pulses 44, and therefore the amount of the LIM signal 2 surrounding the SBS components 6 that are blanked at demodulator 34, can be controlled by the value of the reference voltage generated by reference generator 24. The more precisely that the SBS components 6 of the LIM signal are blanked by demodulator 34 without blanking the remaining components of the LIM signal, the greater the accuracy enhancement that can be achieved through the use of the invention. In general, the advantages of the invention can be achieved by blanking at least a substantial portion of the SBS components 6. In one embodiment of the invention, blanking system 10 removes the SBS components 6 from approximately ±15° of the zero crossings of the rectifier output signal.

The invention offers a number of important advantages. By reducing the amount of the SBS components of the LIM signal applied the PLC integrator, the mirror drive can more precisely control the laser beam path length. The ability of the PLC to maintain peak steady state intensity/power operation of the RLG is thereby enhanced. Furthermore, this function can be efficiently obtained by using the processed dither pick-off signal to synchronize and control the SBS component blanking.

Although the present invention has been described with reference to preferred embodiments, those skilled in the art will recognize that changes can be made in form and detail without departing from the spirit and scope of the invention.

What is claimed is:

1. A path length control system for a laser ring gyro, including:
   a dither pick-off terminal for receiving a dither pick-off signal;
   a laser intensity monitor (LIM) terminal for receiving a LIM signal including single beam signal (SBS) components;
   a demodulator clock terminal for receiving a demodulator clock signal;
   a demodulator coupled to the LIM terminal and responsive to a demodulator control signal for providing a demodulated LIM signal;
   an integrator for processing the demodulated LIM signal to produce a mirror drive signal; and
   a blanking controller coupled to the dither pick-off terminal and the demodulator clock terminal, for generating the demodulator control signal as a function of the dither pick-off signal and the demodulator clock signal, the demodulator control signal causing the SBS components of the LIM signal to be removed from the demodulated LIM signal.

2. The path length control system of claim 1 wherein the blanking controller includes a blanking pulse generator for producing blanking pulses synchronized in time with the SBS components as a function of the dither pick-off signal.

3. A method for operating a path length control system for a ring laser gyro, including:
   receiving a laser intensity monitor (LIM) signal having single beam signal (SBS) components;
   processing the LIM signal to generate a mirror drive signal; and
   blanking the SBS components from the LIM signal being processed to generate the mirror drive signal.

4. The method of claim 3 wherein:
   the method further includes receiving a demodulator clock signal;
   processing the LIM signal includes:
      demodulating the LIM signal as a function of the demodulator clock signal; and
      processing the demodulated LIM signal to generate the mirror drive signal; and
   blanking the SBS components includes blanking the SBS components from the demodulated LIM signal.

5. The method of claim 4 wherein:
   the method further includes receiving a dither pick-off signal; and
   blanking the SBS components includes synchronizing the blanking of the SBS components to the dither pick-off signal.

6. The method of claim 5 wherein blanking the SBS components includes:
   generating SBS blanking pulses as a function of the dither pick-off signal;
   gating the demodulator clock signal and the SBS blanking pulses to produce a LIM demodulating control signal; and
   demodulating the LIM signal with the demodulating control signal.

* * * * *